(12) United States Patent
Hucul

(10) Patent No.: US 6,399,538 B1
(45) Date of Patent: Jun. 4, 2002

(54) PROCESS FOR HYDROGENATING UNSATURATED POLYMERS

(75) Inventor: Dennis A. Hucul, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/717,867

(22) Filed: Nov. 21, 2000

Related U.S. Application Data

(60) Provisional application No. 60/191,370, filed on Mar. 22, 2000, and provisional application No. 60/169,567, filed on Dec. 8, 1999.

(51) Int. Cl.⁷ .......................... B01J 23/00; B01J 21/18; B01J 21/08; B01J 21/12; B01J 23/56
(52) U.S. Cl. ................ 502/325; 502/182; 502/185; 502/241; 502/258; 502/259; 502/260; 502/261; 502/263; 502/311; 502/313; 502/314; 502/332
(58) Field of Search ................. 502/182, 185, 502/241, 258–261, 263, 311, 313, 314, 325, 332

(56) References Cited

U.S. PATENT DOCUMENTS

| | | | |
|---|---|---|---|
| 4,284,835 A | 8/1981 | Kim et al. .................. 585/277 |
| 4,452,950 A | 6/1984 | Wideman et al. ............ 525/339 |
| 4,452,951 A | 6/1984 | Kubo et al. .................. 525/339 |
| 5,028,665 A | 7/1991 | Hucul ......................... 525/339 |
| 5,352,744 A | 10/1994 | Bates et al. .................. 525/339 |
| 5,612,422 A | 3/1997 | Hucul et al. ................. 525/338 |
| 5,654,253 A | 8/1997 | Hucul et al. ................. 502/240 |
| 6,090,359 A | * 7/2000 | Hucul ......................... 423/335 |
| 6,130,360 A | * 10/2000 | Bottcher et al. ............. 568/861 |
| 6,310,112 B1 | * 10/2000 | Vo et al. ..................... 521/134 |

FOREIGN PATENT DOCUMENTS

| | | |
|---|---|---|
| BE | 660 829 | 9/1965 |
| DE | 28 45 615 | 4/1979 |
| EP | 378 104 | 7/1990 |
| EP | 389 119 | 9/1990 |
| FR | 2 344 577 | 10/1977 |
| JP | 03076706 | 8/1989 |
| WO | WO 96 34896 | 11/1996 |

* cited by examiner

Primary Examiner—Mark L. Bell
Assistant Examiner—Patricia L. Hailey

(57) ABSTRACT

A hydrogenation catalyst and a process for hydrogenating an unsaturated polymer comprising contacting the unsaturated polymer with a hydrogenating agent in the presence of a mixed hydrogenation catalyst, characterized in that the mixed hydrogenation catalyst comprises a Group VIII metal component and at least one component selected from the group consisting of a rhenium, molybdenum, tungsten, tantalum and niobium component.

6 Claims, No Drawings

PROCESS FOR HYDROGENATING UNSATURATED POLYMERS

CROSS REFERENCE STATEMENT

This application claims the benefit of U.S. Provisional Application No. 60/191,370, filed Mar. 22, 2000 and U.S. Provisional Application No. 60/169,567, filed Dec. 8, 1999.

The present invention is directed to a process for hydrogenating unsaturated polymers.

BACKGROUND OF THE INVENTION

Unsaturated polymers have been previously hydrogenated using a variety of catalysts and conditions. Historically, typical hydrogenation catalysts have low reactivity and require high catalyst to polymer ratios, especially in aromatic polymer hydrogenation. Improvements in catalytic hydrogenation have been achieved using various metals and supports. Group VIII metals of the Periodic Table of the Elements, have been particularly useful in hydrogenating unsaturated polymers, especially aromatic polymers such as described in U.S. Pat. No. 5,612,422. However, these catalysts have been found to have a relatively short life span in that they deactivate upon contact with polar impurities. These polar impurities are associated with the polymerization process and include polar compounds such as terminators, i.e. alcohols. Therefore, in order to obtain a high number of hydrogenation cycles with the catalyst, the polymer must first be purified in a separate purification step.

Accordingly, it remains highly desirable to provide a process of hydrogenating unsaturated polymers using a catalyst which is resistant to deactivation and does not require polymer purification prior to hydrogenation.

SUMMARY OF THE INVENTION

The present invention is a process for hydrogenating an unsaturated polymer comprising contacting the polymer with a hydrogenating agent in the presence of a mixed hydrogenation catalyst, characterized in that the hydrogenation catalyst comprises a Group VIII metal component and at least one component selected from the group consisting of rhenium (Re), molybdenum (Mo), tungsten (W), tantalum (Ta) and niobium (Nb).

Surprisingly, the mixed hydrogenation catalyst is resistant to deactivation upon exposure to impurities within the polymer, thus allowing for a higher number of reuse cycles in the polymer hydrogenation process.

DETAILED DESCRIPTION OF THE INVENTION

The polymers to be hydrogenated by the process of the present invention, include any unsaturated polymer containing olefinic or aromatic unsaturation. Such polymers include any amorphous saturated hydrocarbon thermoplastic. The term saturated refers to the amount of olefinic bonds within the chemical structure. As used herein, saturated refers to a polymer wherein less than 10 percent of the carbon-carbon bonds are olefinic or unsaturated in nature, generally less than 7.5 percent, typically less than 5 percent, advantageously less than 2 percent, more advantageously less than 1.5 percent, preferably less than 1 percent, more preferably less than 0.5 percent and most preferably less than 0.2 percent. These types of polymers include hydrogenated aromatic polymers, hydrogenated cyclic-olefin-(co)polymers and hydrogenated ring opening metathesis polymers. Specific hydrocarbon polymers include those produced from olefinic monomers, such as homopolymers of butadiene or isoprene, copolymers thereof, and aromatic polymers and copolymers. The aromatic polymers useful in the process of the present invention include any polymeric material containing pendant aromatic functionality. Pendant aromatic refers to a structure wherein the aromatic group is a substituent on the polymer backbone and not embedded therein. Preferred aromatic groups are $C_{6-20}$ aryl groups, especially phenyl. These polymers may also contain other olefinic groups in addition to aromatic groups. Preferably, the polymer is derived from a monomer of the formula:

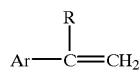

wherein R is hydrogen or alkyl, Ar is phenyl, halophenyl, alkylphenyl, alkylhalophenyl, naphthyl, pyridinyl, or anthracenyl, wherein any alkyl group contains 1 to 6 carbon atoms which may be mono- or multisubstituted with functional groups such as halo, nitro, amino, cyano, carbonyl and carboxyl. More preferably Ar is phenyl or alkylphenyl with phenyl being most preferred. Homopolymers may have any stereostructure including syndiotactic, isotactic or atactic; however, atactic polymers are preferred. In addition, copolymers containing these aromatic monomers including random, pseudo random, block and grafted copolymers may be used. For example, copolymers of vinyl aromatic monomers and comonomers selected from nitrites, acrylates, acids, ethylene, propylene, maleic anhydride, maleimides, vinyl acetate, and vinyl chloride may also be used such as styrene-acrylonitrile, styrene-alpha-methylstyrene and styrene-ethylene. Block copolymers of vinyl aromatic monomers may also be used, such as styrene-alpha-methylstyrene block copolymers, styrene-butadiene or styrene-isoprene block copolymers and the like. Examples include styrene-butadiene, styrene-isoprene, styrene-butadiene-styrene and styrene-isoprene-styrene block copolymers. Further examples of block copolymers may be found in U.S. Pat. Nos. 4,845,173, 4,096,203, 4,200,718, 4,201,729, 4,205,016, 3,652,516, 3,734,973, 3,390,207, 3,231,635, and 3,030,346. Blends of polymers including impact modified, grafted rubber containing aromatic polymers may also be used.

Preferably the number average molecular weight (Mn) of the polymer to be hydrogenated is from 10,000 to 3,000,000, more preferably from 30,000 to 400,000, and most preferably from 50,000 to 300,000, as measured by gel permeation chromatography.

Cyclic-olefin-copolymers suitable for hydrogenation are copolymers of cycloolefin monomers with any other monomer containing aromatic and/or olefinic unsaturation. Cyclic-olefin copolymers include norbornene-type polymers as described in U.S. Pat. Nos. 5,115,041, 5,142,007, 5,143,979, all of which are incorporated herein by reference. The cycloolefin moiety may be substituted or unsubstituted. Suitable cycloolefin monomers include substituted and unsubstituted norbornenes, dicyclopentadienes, dihydrodicyclopentadienes, trimers of cyclopentadiene, tetracyclododecenes, hexacycloheptadecenes, ethylidenyl norbornenes and vinylnorbornenes. Substituents on the cycloolefin monomers include hydrogen, alkyl alkenyl, and aryl groups of 1 to 20 carbon atoms and saturated and unsaturated cyclic groups of 3 to 12 carbon atoms which can be formed with one or more, preferably two, ring carbon atoms. Generally speaking, the substituents on the cycloolefin monomers can be any which do not poison or deactivate the polymerization catalyst. Examples of preferred monomers include but are not limited to dicyclopentadiene, methyltetracyclododecene, 2-norbornene, and other norbornene monomers such as 5-methyl-2-norbornene, 5,6-dimethyl-2-norbornene, 5-ethyl-2-norbornene, 5-ethylidenyl-2-norbornene, 5-butyl-2-norbornene, 5-hexyl-2-norbornene, 5-octyl-2-norbornene, 5-phenyl-2-norbornene, 5-dodecyl-2-norbornene, 5-isobutyl-2-norbornene, 5-octadecyl-2-norbornene, 5-isopropyl-2-norbornene, 5-p-toluyl-2-norbornene, 5-α-naphthyl-2-norbornene, 5-cyclohexyl-2-norbornene, 5-isopropenyl-2-norbornene, 5-vinyl-2-norbornene, 5,5-dimethyl-2-norbornene, tricyclopentadiene (or cyclopentadiene trimer), tetracyclopentadiene (or cyclopentadiene tetramer), dihydrodicyclopentadiene (or cyclopentene-cyclopentadiene co-dimer), methyl-cyclopentadiene dimer, ethyl-cyclopentadiene dimer, tetracyclododecene 9-methyl-tetracyclo[6,2,1,13,6O2,7]dodecene-4, (or methyl-tetracyclododecene), 9-ethyl-tetracyclo[6,2,1,13,6O2,7]dodecene-4, (or ethyl-tetracyclododecene), 9-hexyl-tetracyclo[6,2,1,13,6O2,7]-dodecene-4, 9-decyl-tetracyclo[6,2,1,13,6O2,7]dodecene-4, 9-decyl-tetracyclo[6,2,1,13, 6O2,7]dodecene-4, 9,10-dimethyl-tetracyclo-[6,2,1,13,6O2, 7]dodecene-4, 9-methyl-10-ethyl-tetracyclo[6,2,1,13,6O2, 7]-dodecene-4, 9-cyclohexyl-tetracyclo[6,2,1,13,6O2,7] dodecene-4, 9-chloro-tetracyclo[6,2,1,13,6O2,7]dodecene-4, 9-bromo-tetracyclo[6,2,1,13,6O2,7]-dodecene-4, 9-fluoro-tetracyclo[6,2,1,13,6O2,7]dodecene-4, 9-isobutyl-tetracyclo[6,2,1,13,6O2,7]dodecene-4, and 9,10-dichloro tetracyclo-[6,2,1,13,6O2,7]dodecene-4.

Polymers comprising two or more different types of monomeric units are also suitable. For example, copolymers of methyltetracyclododecane (MTD) and methylnorbornene (MNB) are especially suitable. More preferably, the polymers comprise three or more different types of monomeric units, e.g., terpolymers, including MTD, MNB and dicyclopentadiene (DCPD).

Ring opening metathesis polymers include polymers and copolymers prepared by metathesis ring opening (co) polymerization of a norbornene or tetracyclododecene, such as those described in J-85/26,024 and U.S. Pat. No. 5,053, 471 which is incorporated herein by reference.

The mixed hydrogenation catalyst is characterized in that it comprises a mixture of at least two components. The first component comprises any metal which will increase the rate of hydrogenation and includes nickel, cobalt, rhodium, ruthenium, palladium, platinum, other Group VIII metals, or combinations thereof. Preferably rhodium and/or platinum is used. However, platinum is known to be a poor hydrogenation catalyst for nitrites, therefore, platinum would not be preferred in the hydrogenation of nitrile copolymers. The second component used in the mixed hydrogenation catalyst comprises a promoter which inhibits deactivation of the Group VIII metal(s), upon exposure to polar materials, and is herein referred to as the deactivation resistant component. Such components preferably comprise rhenium, molybdenum, tungsten, tantalum or niobium or mixtures thereof.

The amount of the deactivation resistant component is at least an amount which significantly inhibits the deactivation of the Group VIII metal component when exposed to polar impurities within a polymer composition, herein referred to as a deactivation inhibiting amount. Deactivation of the Group VIII metal is evidenced by a significant decrease in hydrogenation reaction rate. This is exemplified in comparisons of a mixed hydrogenation catalyst and a catalyst containing only a Group VIII metal component under identical conditions in the presence of a polar impurity, wherein the catalyst containing only a Group VIII metal component exhibits a hydrogenation reaction rate which is less than 75 percent of the rate achieved with the mixed hydrogenation catalyst.

Preferably, the amount of deactivation resistant component is such that the ratio of the Group VIII metal component to the deactivation resistant component is from 0.5:1 to 10:1, more preferably from 1:1 to 7:1, and most preferably from 1:1 to 5:1.

The catalyst can consist of the components alone, but preferably the catalyst additionally comprises a support on which the components are deposited. In one embodiment, the metals are deposited on a support such as a silica, alumina or carbon. In a more specific embodiment, a silica support having a narrow pore size distribution and surface area greater than 10 meters squared per gram ($m^2/g$) is used.

The pore size distribution, pore volume, and average pore diameter of the support can be obtained via mercury porosimetry following the proceedings of ASTM D-4284-83.

The pore size distribution is typically measured using mercury porosimetry. However, this method is only sufficient for measuring pores of greater than 60 angstroms. Therefore, an additional method must be used to measure pores less than 60 angstroms. One such method is nitrogen desorption according to ASTM D-4641-87 for pore diameters of less than about 600 angstroms. Therefore, narrow pore size distribution is defined as the requirement that at least 98 percent of the pore volume is defined by pores having pore diameters greater than 300 angstroms and that the pore volume measured by nitrogen desorption for pores less than 300 angstroms, be less than 2 percent of the total pore volume measured by mercury porosimetry.

The surface area can be measured according to ASTM D-3663-84. The surface area is typically between 10 and 100 $m^2/g$, preferably between 15 and 90 with most preferably between 50 and 85 $m^2/g$.

The desired average pore diameter is dependent upon the polymer which is to be hydrogenated and its molecular weight (Mn). It is preferable to use supports having higher average pore diameters for the hydrogenation of polymers having higher molecular weights to obtain the desired amount of hydrogenation. For high molecular weight polymers (Mn>200,000 for example), the typical desired surface area can vary from 15 to 25 $m^2/g$ and the desired average pore diameter from 3,000 to 4000 angstroms. For lower molecular weight polymers (Mn<100,000 for example), the typical desired surface area can vary from 45 to 85 $m^2/g$ and the desired average pore diameter from 300 to 700 angstroms.

Silica supports are preferred and can be made by combining potassium silicate in water with a gelation agent, such as formamide, polymerizing and leaching as exemplified in U.S. Pat. No. 4,112,032. The silica is then hydrothermally calcined as in Iler, R. K., *The Chemistry of Silica*, John Wiley and Sons, 1979, pp. 539–544, which generally consists of heating the silica while passing a gas saturated with water over the silica for about 2 hours or more at temperatures from about 600° C. to about 850° C. Hydrothermal calcining results in a narrowing of the pore diameter distribution as well as increasing the average pore diameter. Alternatively, the support can be prepared by processes disclosed in Iler, R. K., *The Chemistry of Silica*, John Wiley and Sons, 1979, pp. 510–581.

A silica supported catalyst can be made using the process described in U.S. Pat. No. 5,110,779, which is incorporated herein by reference. An appropriate metal, metal component, metal containing compound or mixtures thereof, can be deposited on the support by vapor phase deposition, aqueous or nonaqueous impregnation followed by calcination, sublimation or any other conventional method, such as those exemplified in *Studies in Surface Science and Catalysis*, "Successful Design of Catalysts" V. 44, pg. 146–158, 1989 and *Applied Heterogeneous Catalysis* pgs. 75–123, Institute Français du Pérole Publications, 1987. In methods of impregnation, the appropriate metal containing compound can be any compound containing a metal, as previously described, which will produce a usable hydrogenation catalyst which is resistant to deactivation. These compounds can be salts, coordination complexes, organometallic compounds or covalent complexes.

Typically, the total metal content of the supported catalyst is from 0.1 to 10 wt. percent based on the total weight of the silica supported catalyst. Preferable amounts are from 2 to 8 wt. percent, more preferably 0.5 to 5 wt. percent based on total catalyst weight.

Promoters, such as alkali, alkali earth or lanthanide containing compounds, can also be used to aid in the dispersion of the metal component onto the silica support or stabilization during the reaction, though their use is not preferred.

The amount of supported catalyst used in the hydrogenation process is much smaller than the amount required in conventional unsaturated polymer hydrogenation reactions due to the high reactivity of the hydrogenation catalysts. Generally, amounts of less than 1 gram of supported catalyst per gram of unsaturated polymer are used, with less than 0.1 gram being preferred and less than 0.05 being more preferred. The amount of supported catalyst used is dependent upon the type of process, whether it is continuous, semicontinuous or batch, and the process conditions, such as temperature, pressure and reaction time wherein typical reaction times may vary from about 5 minutes to about 5 hours. Continuous operations can typically contain 1 part by weight supported catalyst to 200,000 or more parts unsaturated polymer, since the supported catalyst is reused many times during the course of continuous operation. Typical batch processes can use 1 part by weight supported catalyst to 5,000 parts unsaturated polymer. Higher temperatures and pressures will also enable using smaller amounts of supported catalyst.

The hydrogenation reaction can be conducted in the absence of a solvent but is preferably conducted in a hydrocarbon solvent in which the polymer is soluble and which will not hinder the hydrogenation reaction. Preferably the solvent is a saturated solvent such as cyclohexane, methylcyclohexane, ethylcyclohexane, cyclooctane, cycloheptane, dodecane, dioxane, diethylene glycol dimethyl ether, tetrahydrofuran, isopentane, decahydronaphthalene or mixtures thereof, with cyclohexane being the most preferred.

The temperature at which the hydrogenation is conducted can be any temperature at which hydrogenation occurs without significant degradation of the polymer. Degradation of the polymer can be detected by a decrease in Mn, an increase in polydispersity or a decrease in glass transition temperature, after hydrogenation. Significant degradation in polymers having a polydispersity between 1.0 and about 1.2 can be defined as an increase of 30 percent or more in polydispersity after hydrogenation. Preferably, polymer degradation is such that less than a 20 percent increase in polydispersity occurs after hydrogenation, most preferably less than 10 percent. In polymers having polydispersity greater than about 1.2, a significant decrease in molecular weight after hydrogenation indicates that degradation has occurred. Significant degradation in this case is defined as a decrease in Mn of 20 percent or more. Preferably, a Mn decrease after hydrogenation will be less than 10 percent. However, polymers such as poly-alpha-methylstyrene or other alpha substituted vinyl aromatic polymers which are more prone to polymer degradation, can tolerate a decrease in Mn of up to 30 percent.

Typical hydrogenation temperatures are from about 40° C. preferably from about 100° C., more preferably from about 110° C., and most preferably from about 120° C. to about 250° C., preferably to about 200° C., more preferably to about 180° C., and most preferably to about 170° C.

The pressure of the hydrogenation reaction is not critical, though hydrogenation rates increase with increasing pressure. Typical pressures range from atmospheric pressure to 70 MPa, with 0.7 to 10.3 MPa being preferred.

The reaction vessel is purged with an inert gas to remove oxygen from the reaction area. Inert gases include but are not limited to nitrogen, helium, and argon, with nitrogen being preferred.

The hydrogenating agent can be any hydrogen producing compound which will efficiently hydrogenate the unsaturated polymer. Hydrogenating agents include but are not limited to hydrogen gas, hydrazine and sodium borohydride. In a preferred embodiment, the hydrogenating agent is hydrogen gas.

The amount of olefinic hydrogenation can be determined using Infrared or proton NMR techniques. The amount of aromatic hydrogenation can be measured using UV-VIS spectroscopy. Cyclohexane solutions of polystyrene give a very distinct absorption band for the aromatic ring at about 260.5 nm. This band gives an absorbance of 1.000 with a solution concentration of 0.004980 moles of aromatic per liter in a 1 cm cell. After removing the catalyst via filtration (using a 0.50 micrometer ($\mu$m) "TEFLON™" filter, Millipore FHUP047) the reaction mixture is placed in a UV cell and the absorbance measured. The absorbance is dependent upon concentration. The hydrogenated polymer products are typically measured at higher concentrations since they are not diluted before the absorbance is measured. Since the reaction solution is about 15–30 times more concentrated than the standards, small amounts of residual unsaturation can be accurately measured.

The amount of hydrogenation is dependent upon the polymer being hydrogenated, the amount of catalyst used, the process conditions and the reaction time. For polymers such as polystyrene and styrene-butadiene copolymers, a typical aromatic hydrogenation is greater than 80%, preferably greater than 99%, and more preferably greater than 99.5%. This can be determined by measuring the absorbance of the hydrogenated polymer and comparing to the absorbance of a nonhydrogenated standard. In other words, the absorbance of a 99.5% hydrogenated polymer will be 99.5% less than the absorbance of the nonhydrogenated polymer. For polymers such as poly alpha-methylstyrene, styrene-alpha-methylstyrene copolymer and copolymers of a vinyl aromatic monomer and a comonomer selected from the group consisting of a nitrile, acrylate, acid, ethylene, propylene, maleic anhydride, maleimide, vinyl acetate and vinyl chloride, the level of hydrogenation can be lower, and is dependent upon the polymer being hydrogenated. Typically, at least 20% aromatic hydrogenation is achieved, preferably at least 30%, more preferably at least 50% and most preferably at least 90% aromatic hydrogenation is achieved.

In polymers containing only olefinic unsaturation, the hydrogenation level is typically greater than 90%, preferably greater than 95%, more preferably greater than 99% and most preferably greater than 99.9%.

In one embodiment of the present invention the unsaturated polymer is typically dissolved in a solvent and placed in a reactor with an appropriate amount of the silica supported mixed hydrogenation catalyst. The reactor is sealed, purged with an inert gas, pressurized with hydrogen and heated to the desired temperature for a time sufficient to substantially hydrogenate the unsaturated polymer. The hydrogenated polymer is removed and the catalyst can be separated from the hydrogenated polymer by any conventional catalyst separation method, such as filtration or centrifugation.

It has been surprisingly discovered that when the combination of components, as described herein, is used, the catalyst is very resistant to deactivation upon contact with impurities. Typical impurities include any material which slows the hydrogenation reaction rate and leads to incomplete conversion. Impurities typically include polar materials such as aromatic and aliphatic alcohols used to terminate the polymerization reaction, e.g. methanol, isopropanol; ethers such as tetrahydrofuran, esters, and nitrogen containing compounds, such as amines.

In one embodiment, the process of the present invention comprises contacting a composition comprising an unsaturated polymer and at least one polar impurity, with a hydrogenation agent in the presence of a supported mixed hydrogenation catalyst, characterized in that the supported mixed hydrogenation catalyst comprises at least one Group VIII metal component and at least a deactivation inhibiting amount of at least one deactivation resistant component selected from the group consisting of a rhenium, molybdenum, tungsten, tantalum and niobium component.

The following examples are set forth to illustrate the present invention and should not be construed to limit its scope. In the examples, all parts and percentages are by weight unless otherwise indicated.

The amount of hydrogenation is measured using UV-VIS spectroscopy as described previously.

Mn is an absolute molecular weight measured by gel permeation chromatography, unless otherwise specified.

All polymer samples used in the examples have atactic stereostructure.

EXAMPLES

Preparation of Pt/Re Catalyst

A solution of 0.411 grams (g) $H_2PtCl_6.6(H_2O)$ and 0.147 g of $NH_4ReO_4$ is dissolved in 15.55 grams of purified water. This solution is then added to 5.0 g of silica which is then air dried overnight, and further dried at 110° C. in an air purged oven for 30 minutes. The catalyst is reduced in flowing hydrogen at 150° C. for 1 hour to yield a catalyst having 3 weight percent Pt and 2 weight. percent Re on $SiO_2$.

Example 1

Hydrogenation of Polystyrene Containing Methanol Impurity with Pt/Re Catalyst 1.0 g of the reduced Pt/Re catalyst described above is added to 240 g of a 15 wt. percent solution of a styrene homopolymer (Mn 305,000) in cyclohexane containing 504 ppm methanol, in a stirred autoclave style reactor. The reactor is sealed and the vapor space purged with nitrogen and filled with pure hydrogen. The temperature is then raised to about 150° C. and the reactor is pressurized with hydrogen to 10.3 MPa. Analysis of the polymer shows greater than 98% hydrogenation of the aromatic region. Hydrogenation consumption under reaction conditions occurs over about a 100 minute time period.

Example 2

Hydrogenation of Polystyrene in the Absence of Methanol with Pt/Re Catalyst

Example 1 is repeated in the absence of methanol. The reaction rate and extent of hydrogenation is the same as in Example 1.

These examples demonstrate that the presence of 504 ppm of methanol has no effect on the reaction rate for a Pt—Re catalyst.

Comparison 1

Hydrogenation of Polystyrene in the Absence of Methanol Using a Pt Catalyst 1.0 g of a Pt reduced catalyst prepared as described above (absent the addition of Re) is added to 225 g of a 15 weight percent solution of a polystyrene homopolymer (Mn of 305,000) in cyclohexane, in a stirred autoclave style reactor. The reactor is sealed, the vapor space is purged with nitrogen and filled with pure hydrogen. The temperature is then raised to about 155° C. and the reactor is pressurized with hydrogen to 10.3 MPa. The polymer undergoes rapid hydrogenation and analysis shows 100% saturation of the aromatic region. Hydrogenation consumption under reaction conditions occurs over about a 90 minute time period.

Comparison 2

Hydrogenation of Polystyrene Containing Methanol Impurity Using a Pt Catalyst

Comparison 1 is repeated in the presence of 355 ppm methanol and 50% additional catalyst (1.5 g). The reaction rate is more than 10 fold slower and the extent of hydrogenation of the aromatic ring after 6 hours is only 48%.

These comparatives demonstrate that even a small amount of methanol (355 ppm) has a profound effect on the ability of a 'Pt only' catalyst to give high conversions of the aromatic region.

Example 3

Hydrogenation of Block Copolymer Containing Methanol Impurity Using a Pt/Re Catalyst 1.0 g of the reduced Pt/Re catalyst prepared as described above is added to 240 g of a 15 weight % solution of a block copolymer (60% by weight polystyrene and 40% by weight butadiene, total Mn 50,000) in cyclohexane, containing 540 ppm methanol in a stirred autoclave style reactor. The reactor is sealed, the vapor space is purged with nitrogen and filled with pure hydrogen. The temperature is then raised to about 165° C. and the reactor is pressurized with pure hydrogen to 10.3 MPa. The polymer undergoes rapid hydrogenation and analysis shows 100% saturation of the olefin region and greater than 99.96% hydrogenation of the aromatic region. Hydrogenation consumption under reaction conditions occurs over about a 90 minute time period.

Example 4

Hydrogenation of Block Copolymer in the Absence of Methanol Impurity Using a Pt/Re Catalyst The same experiment is repeated as in Example 3 in the absence of methanol. The reaction rate is the same and the extent of hydrogenation is the same as that with methanol present.

These examples demonstrate that the presence of 540 ppm of methanol has no effect on the reaction rate for a Pt—Re catalyst.

Comparison 3

Hydrogenation of Block Copolymer in the Absence of Methanol Impurity Using Pt Catalyst 1.0 g of a reduced catalyst (5% Pt/SiO$_2$) prepared as described previously (absent the addition of Re) is added to 225 g of a 15 weight percent solution of a block copolymer (80% by weight polystyrene and 20% by weight butadiene) in cyclohexane, in a stirred autoclave style reactor. The reactor is sealed, the vapor space is purged with nitrogen and filled with pure hydrogen. The temperature is then raised to about 160° C. and the reactor is pressurized with pure hydrogen to 10.3 MPa. The polymer undergoes rapid hydrogenation and analysis shows complete hydrogenation of the butadiene portion and greater than 98.1% saturation of the aromatic region. Hydrogenation consumption under reaction conditions occurs over about a 90 minute time period.

Comparison 4

Hydrogenation of Block Copolymer Containing Methanol Impurity Using Pt Catalyst

Comparison 3 is repeated in the presence of 1024 ppm methanol and additional catalyst (1.0 g). The aromatic hydrogenation reaction rate is more than 10 fold slower and the extent of hydrogenation of the aromatic region after 6 hours is less than 25%.

These comparatives demonstrate that even a small amount of methanol (1024 ppm) has a profound deactivation effect on a pure Pt catalyst.

Example 5

Hydrogenation of Block Copolymer Containing THF Impurity Using a Pt/Re Catalyst 1.0 g of a reduced Pt/Re catalyst prepared as described previously but containing 4 percent Pt and 1 percent Re on SiO$_2$ is added to 240 g of a 15 weight % solution of a block copolymer (60% by weight polystyrene and 40% by weight butadiene, Mn 50,000) in cyclohexane, containing 2183 ppm tetrahydrofuran (THF) in a stirred autoclave style reactor. The reactor is sealed, the vapor space is purged with nitrogen and filled with pure hydrogen. The temperature is then raised to about 165° C. and the reactor is pressurized with pure hydrogen to 10.3 MPa. The polymer undergoes rapid hydrogenation and analysis shows 100% saturation of the olefin region and greater than 99.95% hydrogenation of the aromatic region.

This example demonstrates that THF, even at levels of 2183 ppm, does not affect the hydrogenation rate of the aromatic region when using a Pt/Re catalyst.

Preparation of Pt/Ta Catalyst 0.468 g of platinum 2,4-pentanedionate [Pt(C$_5$H$_7$O$_2$)$_2$] and 0.252 g of tantalum tetraethoxide 2,4-pentanedionate [Ta(OC$_2$H$_5$)$_4$(C$_5$H$_7$O$_2$)] are dissolved in 21.06 grams of toluene at 55° C. This solution is then added to 6.0 g of silica. The excess toluene is evaporated overnight and the resulting material is further dried at 110° C. in an air purged oven for 30 minutes. The catalyst is then reduced in flowing hydrogen at 150° C. for 1 hour. The preparation yields a catalyst that is 3.66 percent Pt and 1.56 percent Ta on SiO$_2$.

Example 6

Hydrogenation of a Block Copolymer Containing Methanol Impurity Using a Pt/Ta Catalyst 1.0 g of the Pt/Ta reduced catalyst is added to 240 g of a 15 weight % solution of a block copolymer (80% by weight polystyrene and 20% by weight butadiene, Mn 52,000) in cyclohexane, containing 1083 ppm methanol, in a stirred autoclave style reactor. The reactor is sealed, the vapor space is purged with nitrogen and filled with pure hydrogen. The temperature is then raised to about 165° C. and the reactor is pressurized with pure hydrogen to 10.3 MPa. The polymer undergoes rapid hydrogenation and analysis shows 100% saturation of the olefin region and greater than 95% hydrogenation of the aromatic region. Hydrogenation consumption under reaction conditions occurs over about a 90 minute time period.

Example 7

Hydrogenation of a Block Copolymer in Absence of Methanol Impurity Using a Pt/Ta Catalyst Example 6 is repeated in the absence of methanol. The initial hydrogen consumption rate is actually somewhat slower in the absence of methanol. Analysis shows 100% saturation of the olefin region and greater than 99.8% hydrogenation of the aromatic region.

These examples demonstrate that the presence of 1083 ppm of methanol has very little effect on the reaction rate for a Pt—Ta catalyst.

Preparation of Pt/Mo Catalyst 0.328 g of H$_2$PtCl$_6$.6H$_2$O and 0.239 g of MoCl$_5$ is dissolved in 14.48 grams of ethanol. This solution is added to 4.0 g of silica. The excess ethanol is evaporated overnight and the resulting material is further dried at 110° C. in an air purged oven for 30 minutes. The catalyst is reduced in flowing hydrogen at 150° C. for 1 hour. The preparation yields a catalyst that is 3.0 percent Pt and 2.0 percent Mo on SiO$_2$.

Example 8

Hydrogenation of Block Copolymer Containing Methanol Impurity Using a Pt/Mo Catalyst 1.0 g of the Pt/Mo reduced catalyst described above is added to 240 g of a 15 weight % solution of a block copolymer (75% by weight polystyrene and 25% by weight butadiene, Mn 60,000) in cyclohexane containing 533 ppm methanol, in a stirred autoclave style reactor. The reactor is sealed, the vapor space is purged with nitrogen and filled with pure hydrogen. The temperature is then raised to about 165° C. and the reactor is pressurized with pure hydrogen to 10.3 MPa. The polymer undergoes rapid hydrogenation and analysis shows 100% saturation of the olefin region and greater than 99.8% hydrogenation of the aromatic region. Hydrogenation consumption under reaction conditions occurs over about a 90 minute time period.

Example 9

Hydrogenation of Block Copolymer in the Absence of Methanol Using a Pt/Mo Catalyst Example 8 is repeated in the absence of methanol. The initial hydrogen consumption rate is actually somewhat slower in the absence of methanol. Analysis shows 100% saturation of the olefin region and greater than 99.95% hydrogenation of the aromatic region.

These examples demonstrate that the presence of 533 ppm of methanol has very little effect on the reaction rate for a Pt—Mo catalyst.

Therefore, as seen in the examples and comparatives, the mixed metal catalysts are unexpectedly superior in the presence of impurities when compared to Group VIII metals used alone.

What is claimed is:

1. A mixed hydrogenation catalyst, characterized in that the mixed hydrogenation catalyst comprises a Group VIII metal component and at least one deactivation resistant component selected from the group consisting of a rhenium, molybdenum, tungsten, tantalum and niobium component, wherein the ratio of the Group VIII metal component to the deactivation resistant component is from 1:1 to 10:1.

2. The catalyst of claim 1 additionally comprising a silica, alumina or carbon support.

3. The catalyst of claim 2, wherein the support has a surface area of from 15 to 25 $m^2/g$ and an average pore diameter from 3,000 to 4000 angstroms.

4. The catalyst of claim 2, wherein the support has a surface area of 45 to 85 $m^2/g$ and an average pore diameter from 300 to 700 angstroms.

5. The catalyst of claim 2, wherein the support has a narrow pore size distribution such that at least 98 percent of the pore volume is defined by pores having pore diameters greater than 300 angstroms and that the pore volume measured by nitrogen desorption for pores less than 300 angstroms, be less than 2 percent of the total pore volume measured by mercury porosimetry.

6. The catalyst of claim 5, wherein the Group VIII metal comprises platinum, the deactivation resistant component comprises a rhenium component and the support comprises a silica.

* * * * *